United States Patent Office 3,143,550
Patented Aug. 4, 1964

3,143,550
SUBSTITUTED TETRAHYDROISOQUINOLINES
Elwyn Evans, Wembley, and Herbert James White, Chalfont St. Giles, England, assignors to Glaxo Laboratories Limited, Greenford, England, a British company
No Drawing. Filed Aug. 27, 1962, Ser. No. 219,723
Claims priority, application Great Britain Sept. 8, 1961
15 Claims. (Cl. 260—288)

This invention concerns a process for the preparation of substituted tetrahydroisoquinolines.

Copending U.S. patent application Serial No. 40,200, now Patent No. 3,121,720, describes the condensation of 3,4-dihydroisoquinoline and its ring substituted derivatives, with reactive methylene compounds such as acetoacetic acid or acetone dicarboxylic acid and reaction of the products so formed with a vinyl ketone to form adducts of the skeletal formula

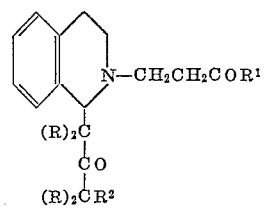
I where the groups R represent hydrogen atoms or organic groups such as alkyl groups, aralkyl groups etc. $R^1$ represents an organic group such as an aliphatic, araliphatic, aromatic group etc. and $R^2$ represents a hydrogen atom or an organic group such as a carboxyl group, an alkyl, aralkyl or aryl group or a heterocyclic group such as a further tetrahydroisoquinol-1-yl group.

We have now found that the products of skeletal Formula I can be produced more conveniently and in generally higher yield by reacting the 3,4-dihydroisoquinoline compound with the vinyl ketone in the presence of an alcohol e.g. ethanol and adding the reactive methylene compound either simultaneously or subsequently.

According to the present invention, therefore, we provide a process for the preparation of compounds of the skeletal formula

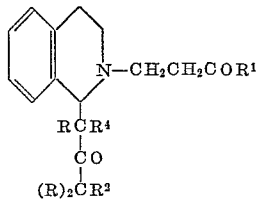
II (where the substituents R, which may be the same or different, represent hydrogen atoms or organic groups, $R^1$ represents an aliphatic, araliphatic or aromatic hydrocarbon group, $R^2$ represents a hydrogen atom or an organic group and $R^4$ represents a hydrogen atom or activating group) in which a 3,4-dihydroisoquinoline compound of the skeletal formula

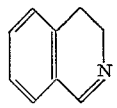
III is reacted with a vinyl ketone of the general formula $$CH_2=CH—CO—R^1$$

(where $R^1$ has the above meaning) in the presence of an alcohol, a reactive methylene compound of the general formula $$R^6—CHR—CO—C(R)_2—R^5$$

(where $R^5$ is a hydrogen atom or an organic group and $R^6$ is an activating group) being added to the reaction mixture simultaneously with the vinyl ketone or subsequently.

The 3,4-dihydroisoquinoline compounds which are used as starting materials may be variously substituted in the nucleus, i.e. in the 3,4,5,6,7 and/or 8 positions, for example, with aliphatic, araliphatic or aromatic hydrocarbon, ether or thioether groups or tertiary amino groups e.g. methyl, ethyl, propyl, isopropyl, butyl, amyl, benzyl, phenyl, methoxy, ethoxy, propoxy, butoxy, benzyloxy, phenoxy or dialkyl amino groups. Alkoxy groups having 1–5 carbon atoms are preferred. Substituents may also occupy more than one position as in the case of methylene dioxy groups. According to a feature of the invention products useful in the synthesis of emetine and dehydroemetine can be prepared in which case the 6 and 7 positions carry methoxy groups, the 3,4,5 and 8 positions being unsubstituted.

In the vinyl ketone, $R^1$ is advantageously an alkyl group having 1–5 carbon atoms, especially a methyl group since a subsequent cyclisation, described below, affords a $C_2$-side chain as in emetine.

In the reactive methylene compound, $R^6$ preferably represents a carboxyl, alkoxycarbonyl or acyl group. It is also preferred that $R^5$ should be a carboxyl, alkoxy carbonyl or acyl group, or an aliphatic, aromatic or araliphatic hydrocarbon group especially an alkyl group having 1–5 carbon atoms or a heterocyclic group such as a tetrahydroisoquinol-1-yl group, especially when $R^6$ is a carboxyl group. The groups R are preferably all hydrogen atoms.

Where one or both of $R^5$ and $R^6$ are carboxyl groups, reaction with the reactive methylene compound normally takes place at the adjacent carbon atoms with spontaneous decarboxylation. The substituents $R^2$ and $R^4$ are therefore the same as $R^5$ and $R^6$ respectively except when decarboxylation or other elimination reactions occur.

When the reactive methylene compound is acetone dicarboxylic acid, the resulting product is normally a bis-tetrahydroisoquinolyl compound, of the skeletal formula

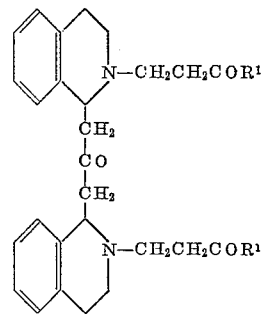
IV where $R^1$ has the above meaning, which may be used in the synthesis of emetine and related products.

It should be noted that where $R^2$ is a tetrahydroisoquinol-1-yl group, the resulting products are also of the bis-type useful in the synthesis of emetine compounds but that the possibility exists of obtaining products in which one nitrogen atom carries a side-chain—$CH_2CH_2COR^1$ while the other carries some other substituent such as an alkyl or benzyl group which may serve as a protecting group.

The alcohol used in the reaction is preferably an alkanol advantageously having 1–5 carbon atoms, such as methanol, ethanol, propanol, butanol, amyl alcohol, etc. Ethanol is preferred for this purpose since it appears to lead to especially high yields.

The reaction of the vinyl ketone and the alcohol with the dihydroisoquinoline compound is preferably effected in an excess of the alcohol as solvent medium. An inert solvent or diluent may be added but since, as is indicated below, the desired product can often be crystallized in good yield as a salt by the addition of mineral acid, such a solvent is preferably water miscible.

The addition reaction and the subsequent condensation are both preferably effected within the range 0–25° C.

We have further found that the product prepared by the above process which is of particular interest in the preparation of emetine, namely the compound of formula

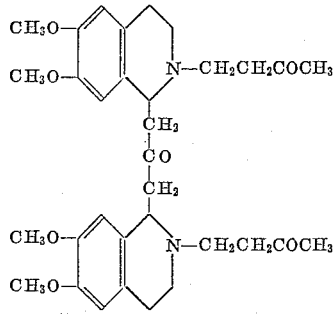

may be crystallised directly from the reaction mixture by addition, in suitable amounts, of mineral acid such as sulphuric or hydrochloric acid.

Compound V exists as a dl-form and a meso-form, designated for convenience VA and VB. Compound VB is that which leads to emetine and is thus the preferred product. We have further found that by adding sulphuric acid to the reaction mixture, before or during the reaction with the acetone dicarboxylic acid, the yield of the isomer VB may be increased at the expense of isomer VA so that substantially pure isomer VB can be obtained. The quantity of sulphuric acid used is, however, critical and we have found that addition of more than 1 equivalent of sulphuric acid gives gummy products yielding little isomer VB while less than 1 equivalent naturally gives reduced yields of the desired VB sulphate, although in a purer form. When 2 equivalents of sulphuric acid were added, none of the VB sulphate was isolated. If the sulphuric acid is added after the condensation is completed, the product appears to be a mixture of the isomeric sulphates.

If hydrochloric acid is used in place of sulphuric acid, the product is principally compound VA hydrochloride.

It is a particular advantage of the process according to the invention that the addition of the vinyl ketone, the condensation with the reactive methylene compound and the formation of the desired crystalline salt can all be effected in the same reaction medium with consequent economy in large scale production. It is, however, possible to isolate the intermediate product before condensation.

The products of Formula I prepared according to the invention may be converted to compounds having the benzoquinolizine ring structure, e.g. by treatment with alkali or acid as is described in copending U.S. patent application Serial No. 40,200, now patent No. 3,121,720. Such benzoquinolizines are, in fact, in the form of cyclic alcohols, the condensation of the chains in the 1- and 2-positions of the tetrahydroisoquinoline ring resulting in formation of a hydroxyl group in the 2-position of the benzoquinolizine. The formation of such cyclic alcohols may be used, inter alia, in the characterisation of the products of Formula I.

In order that the invention may be well understood we give the following examples by way of illustration only. All temperatures are in ° C.

EXAMPLE 1

*Preparation of (a) Compound VB Sulphate - 1,3 - Bis- (1,2,3,4 - Tetrahydro - 6,7 - Dimethoxy - 2 - (3 - Oxobutyl) - Isoquinol - 1 - Yl) Acetone Sulphate and (b) Formation of Corresponding Cyclic Alcohol HCl - 3- Acetyl - 1,2,3,4,6,7 - Hexahydro - 2 - Hydroxy - 9,10- Dimethoxy - 2 - {1,2,3,4 - Tetrahydro - 6,7 - Dimethoxy- 2 - (3 - Oxobutyl) - Isoquinol - 1 - Yl - Methyl} 11b- [H] - Benzo [a] - Quinolizine Hydrochloride*

(a) 3,4 - dihydro - 5,6 - dimethoxyisoquinoline (100 g.) was dissolved in industrial methylated spirit (750 ml.) and the solution cooled to 5°. Methyl vinyl ketone (50 ml., 1.17 equivalents) was added and the solution recooled to 5° and kept at this temperature for 15 minutes. Sulphuric acid (14 ml., 1 molecular equivalent) was added dropwise followed by a solution of acetone dicarboxylic acid (40 g.) in industrial methylated spirit (250 ml.) containing 20 ml. of water. The solution was allowed to stand in the refrigerator for 48 hours when the product separated as a crystalline mass. It was filtered off and washed with industrial methylated spirit (100 ml.) and ether (200 ml.) and dried in vacuo at 60°. Weight=140 g., M.P. 125–127°. Found: C, 54.3; H, 6.9; N, 3.72; S, 4.8. $C_{33}H_{44}O_7N_2.H_2SO_4.3H_2O$ requires C, 54.1; H, 7.2; N, 3.8; S, 4.4.

(b) 10 g. of the product was suspended in chloroform (100 ml.) and a solution of sodium (1 g.) in methyl alcohol (20 ml.) was added. The mixture was kept at —5° for 2½ hours and then acidified with alcoholic hydrogen chloride and filtered. The solution was evaporated to dryness and the residual froth recrystallised from industrial methylated spirit (30 ml.) to give 5.24 g. of cyclic alcohol B hydrochloride, M.P. 190–192° (decomp.). Found: C, 57.1; H, 7.2; Cl, 9.4; N, 3.9. $C_{33}H_{44}O_7N_2.2HCl.2H_2O$ requires C, 57.5; H, 7.3; Cl, 10.3; N, 4.1.

EXAMPLE 2

3,4 - dihydro - 6,7 - dimethoxyisoquinoline (20 g.) was treated as in Example 1 but the amount of sulphuric acid was reduced to 0.6 molecular equivalent (1.6 ml.). The product weighed 21 g. and had M.P. 135–137°. Cyclisation of 10 g. as in Example 1 yielded 6.38 g. of cyclic alcohol B hydrochloride M.P. 189–192° (decomp.).

EXAMPLE 3

3,4 - dihydro - 6,7 - dimethoxyisoquinoline (10 g.) was treated as in Example 1, but the sulphuric acid was replaced by hydrogen chloride (1.91 g.) in ethyl alcohol. The product (11.21 g.) which separated was compound VA hydrochloride, M.P. 175–177°; 10 g. of the material was cyclised as in Example 1 to give 6.68 g. of cyclic alcohol A hydrochloride, M.P. 200–204°.

EXAMPLE 4

3,4 - dihydro - 6,7 - dimethoxyisoquinoline (20 g.) in industrial methylated spirit (150 ml.) was treated with methyl vinyl ketone (10 ml.) for 15 minutes at 10°. The solution was then evaporated at room temperature and reduced pressure to a gum (26 g.).

Part of the gum (13 g.) was taken up in industrial methylated spirit (75 ml.) and treated with acetone-dicarboxylic acid (4 g.) in industrial methylated spirit (24 ml.) and water (2 ml.) and with sulphuric acid (2.8 ml.) at 0° for 48 hours. Compound VB sulphate (11.33 g.) M.P. 114–116° separated out, 10 g. of which on cyclisation as in Example 1 gave 5.14 g. of cyclic alcohol B hydrochloride.

EXAMPLE 5

3,4 - dihydro - 6,7 - dimethoxyisoquinoline (10 g.) in methanol (75 ml.) was cooled to 10° and treated with methyl vinyl ketone (5 ml.). The reaction mixture was allowed to stand for 15 minutes at 10° and then evaporated to dryness to give a yellow, rather gummy, solid, weighing 13.7 g. A solution of acetone dicarboxylic acid (4 g.) in industrial methylated spirits (100 ml.), containing sulphuric acid (1.4 ml.) and water (1.0 ml.), was added to the above solid. The mixture was shaken at room temperature until the solid had dissolved and decarboxylation had commenced. The reaction mixture was kept at 0° for 3 days. The crystalline deposit was filtered off, washed with industrial methylated spirit and then with ether. The solid was dried at 60° in vacuo to give compound VB sulphate (8.45 g.) M.P. 111–113°. Cyclisation of this material, as in Example 1, gave a 46.4% yield of cyclic alcohol B hydrochloride.

EXAMPLE 6

3,4 - dihydro - 6,7 - dimethoxyisoquinoline (50 g.) was dissolved in ether (250 ml.) and absolute alcohol (40 ml.) at 10°. Methyl vinyl ketone (25 ml.) was added and the solution allowed to stand at 0° overnight. The supernatant liquor was decanted from a clear gum which had deposited in the flask. The gum was washed with ether (2×100 ml.) by decantation and then sucked dry under high vacuum for 6 hours to give 42 g. of yellow solidified froth. A portion of this solidified froth (38 g.) was dissolved in industrial methylated spirit (175 ml.) and concentrated sulphuric acid (3.3 ml.) was added, followed by acetone dicarboxyl acid (9.5 g.). The mixture was allowed to stand in the refrigerator for 48 hours and the crystalline precipitate was filtered off, washed and dried to give 29.25 g. of compound VB sulphate.

EXAMPLE 7

3,4 - dihydro - 6,7 - dimethoxyisoquinoline (50 g.) in ether (250 ml.) and isopropanol (100 ml.) was treated with methyl vinyl ketone as described in the previous example to give 44 g. of solidified froth. A portion of this froth (40 g.) was reacted with acetone dicarboxylic acid in industrial methylated spirit and concentrated sulphuric acid, as described in the previous example, to give 36.25 g. of compound VB sulphate.

We claim:

1. A process for the preparation of a compound of the formula

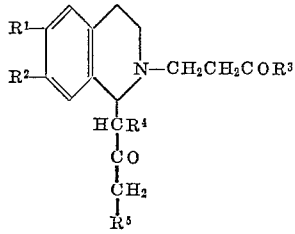

where $R^1$ and $R^2$ are selected from the group consisting of hydrogen, lower alkoxy, and lower alkylene dioxy represented by $R^1$ and $R^2$ taken together; $R^3$ is lower alkyl; $R^4$ is selected from the group consisting of hydrogen, lower alkoxy carbonyl, carboxyl, lower alkanoyl and $R^5$ is selected from the group consisting of $R^4$; lower alkyl, monocyclic aralkyl, monocyclic aryl and the group

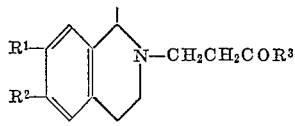

where $R^1$, $R^2$ and $R^3$ have the above meanings in which a compound of the formula

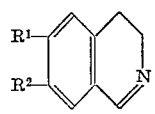

where $R^1$ and $R^2$ have the above meanings is first reacted with a vinyl ketone of the formula $$CH_2=CHCOR^3$$

where $R^3$ has the above meaning in the presence of a medium consisting essentially of an alcohol and then adding a reactive methylene compound of the formula $$R^6CH_2COCH_2R^7$$

where $R^6$ is selected from the group consisting of carboxyl, alkoxy carbonyl and lower alkanoyl and $R^7$ is selected from the group consisting of $R^6$, hydrogen, lower alkyl, monocyclic aryl, monocyclic aralkyl and the group

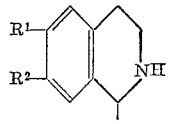

where $R^1$ and $R^2$ have the above meanings.

2. A process as claimed in claim 1 wherein the vinyl ketone and the reactive methylene compound are added simultaneously.

3. A process as claimed in claim 1 where $R^1$ and $R^2$ are lower alkoxy; $R^3$ is lower alkyl and the reactive methylene compound is acetone dicarboxylic acid.

4. A process as claimed in claim 1 in which the alcohol is an alkanol.

5. A process as claimed in claim 4 in which the alkanol has 1–5 carbon atoms.

6. A process as claimed in claim 1 in which the reaction is effected in a water-soluble reaction medium.

7. A process as claimed in claim 6 in which an excess of the said alcohol serves as solvent medium.

8. A process as claimed in claim 1 in which the over-all process is effected at between 0° and 25° C.

9. A process as claimed in claim 1 in which the reactive methylene compound is acetone dicarboxylic acid and the reaction is effected with a sufficient quantity of dihydroisoquinoline compound to yield a compound of the formula

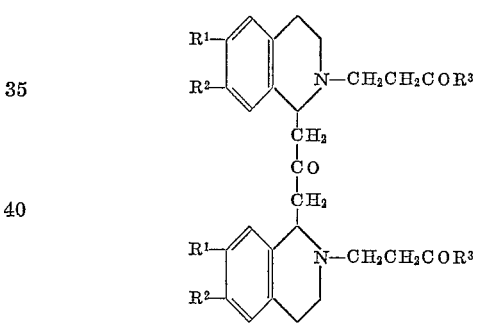

where $R^1$ and $R^2$ are lower alkoxy and $R^3$ has the above meaning.

10. A process as claimed in claim 9 in which the 3,4-dihydroisoquinoline ocmpound is 6,7-dimethoxy-3,4-dihydroisoquinoline and $R^3$ is a methyl group.

11. A process as claimed in claim 10 in which a mineral acid is added to the reaction mixture before reaction with the acetonedicarboxylic acid.

12. A process as claimed in claim 11 in which the mineral acid is selected from the group consisting of sulphuric acid and hydrochloric acid.

13. A process as claimed in claim 11 in which approximately 1 equivalent of mineral acid is added based on the quantity of nitrogen base present.

14. A process as claimed in claim 10 in which a mineral acid is added to the reaction mixture during reaction with the acetone dicarboxylic acid.

15. A process as claimed in claim 6 in which an inert solvent is present in the reaction mixture during the reaction between the alcohol, the vinyl ketone and the dihydroisoquinoline compound.

References Cited in the file of this patent

UNITED STATES PATENTS 3,045,021    Brossi _____ July 17, 1962
3,121,720    Barton et al. _____ Feb. 18, 1964

OTHER REFERENCES

Glaxo Laboratories, Australian specification 62,234/60, Jan. 12, 1961.